(12) United States Patent
Chen et al.

(10) Patent No.: US 7,483,267 B2
(45) Date of Patent: Jan. 27, 2009

(54) MOUNTING APPARATUS FOR SECURING STORAGE DEVICE

(75) Inventors: Yun-Lung Chen, Tu-Cheng (TW); Wu Long, Shenzhen (CN); Fa-Ming Jiang, Shenzhen (CN); Gang Su, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 500 days.

(21) Appl. No.: 11/285,636

(22) Filed: Nov. 21, 2005

(65) Prior Publication Data

US 2006/0139871 A1   Jun. 29, 2006

(30) Foreign Application Priority Data

Dec. 25, 2004   (CH)   .................. 2004 2 0103478

(51) Int. Cl.
G06F 1/16 (2006.01)

(52) U.S. Cl. ........................................ 361/685
(58) Field of Classification Search ................. 361/685
See application file for complete search history.

(56) References Cited

U.S. PATENT DOCUMENTS

| 4,979,909 A | 12/1990 | Andrews |
| 6,614,654 B2* | 9/2003 | Liu et al. ............... 361/685 |
| 6,625,014 B1 | 9/2003 | Tucker et al. |
| 6,667,880 B2* | 12/2003 | Liu et al. ............... 361/685 |
| 6,813,148 B2* | 11/2004 | Hsu et al. ............... 361/685 |
| 7,035,099 B2* | 4/2006 | Wu ........................ 361/685 |
| 7,036,783 B2* | 5/2006 | Chen et al. ........... 248/298.1 |
| 7,072,178 B2* | 7/2006 | Chen et al. ............. 361/685 |
| 7,088,580 B2* | 8/2006 | Chen et al. ............. 361/685 |
| 7,102,885 B2* | 9/2006 | Chen et al. ............. 361/685 |
| 2006/0090869 A1* | 5/2006 | Heikkila et al. ........ 162/246 |
| 2006/0139870 A1* | 6/2006 | Chen et al. ............. 361/685 |
| 2006/0164803 A1* | 7/2006 | Chen et al. ............. 361/685 |
| 2006/0187632 A1* | 8/2006 | Chen et al. ............. 361/685 |
| 2007/0081305 A1* | 4/2007 | Chien et al. ............ 361/685 |

\* cited by examiner

*Primary Examiner*—Lisa Lea-Edmonds
(74) *Attorney, Agent, or Firm*—Morris Manning Martin LLP; Tim Tingkang Xia, Esq.

(57) ABSTRACT

A storage device assembly includes a storage device (50) with a fastener (524) thereon, a bracket (10) for accommodating the storage device and an operating member (40) slidably attached to the bracket. The bracket defines a guiding hole (166) for the fastener of the storage device inserting therethrough. The operating member includes a latching portion (426) and a deflectable mounting portion (46). The operating member has a locked position in which the latching portion engages with the fastener, and a unlocked position in which the mounting portion is biased to disengage the latching portion from the fastener.

20 Claims, 11 Drawing Sheets and aslant surface 362, a
MOUNTING APPARATUS FOR SECURING STORAGE DEVICE

BACKGROUND OF THE INVENTION

1. Field of the Invention

The present invention relates to mounting apparatuses, and more particularly to a mounting apparatus for conveniently securing storage device into a computer enclosure.

2. Background of the Invention

Usually, a storage device, such as hard disk, is simply screwed to a bracket of a computer enclosure. This conventional mounting means substantially wastes the time, and adds complexity and difficulty of assembling the storage device to the computer enclosure and later disassembling therefrom.

An apparatus is disclosed for removing mass storage devices from an internal support frame in a computer system. The support frame defines a plurality of openings in side walls. The apparatus has resilient, side-mounted engagement members adapted for receipt in openings of the support frame to lock the storage device in position. To remove the storage device, a rotatable lever is connected to one side wall of the support frame. The lever includes one projection member positioned adjacent the opening through the side wall to which the lever is connected. To remove the storage device from the support frame, the lever is rotated so that the projection member contacts the engagement member. Continued rotation of the lever causes the engagement member to be urged inward and out of the opening in the side wall. As a result, the storage device is unlocked from the frame. This mounting means described above is convenient to secure the storage device. However, the side-mounted engagement members increase gaps between the storage device and the side wall of the support frame which increases the leakiness of EMI (electronic magnetic interference).

What is needed, therefore, is a mounting apparatus for conveniently securing a storage device to a bracket of a computer enclosure and reducing the gap between the storage device and the bracket.

SUMMARY

A storage device assembly includes a storage device with a fastener thereon, a bracket for accommodating the storage device, and an operating member slidably attached to the bracket. The bracket defines a guiding hole for the fastener of the storage device inserting therethrough. The operating member includes a latching portion and a deflectable mounting portion. The operating member has a locked position in which the latching portion engages with the fastener, and a unlocked position in which the mounting portion is biased to disengage the latching portion from the fastener.

Advantages and novel features of the present invention will be drawn from the following detailed description of preferred embodiment with attached drawings, in which:

DETAIL DESCRIPTION OF PREFERRED EMBODIMENT

Figure 1:
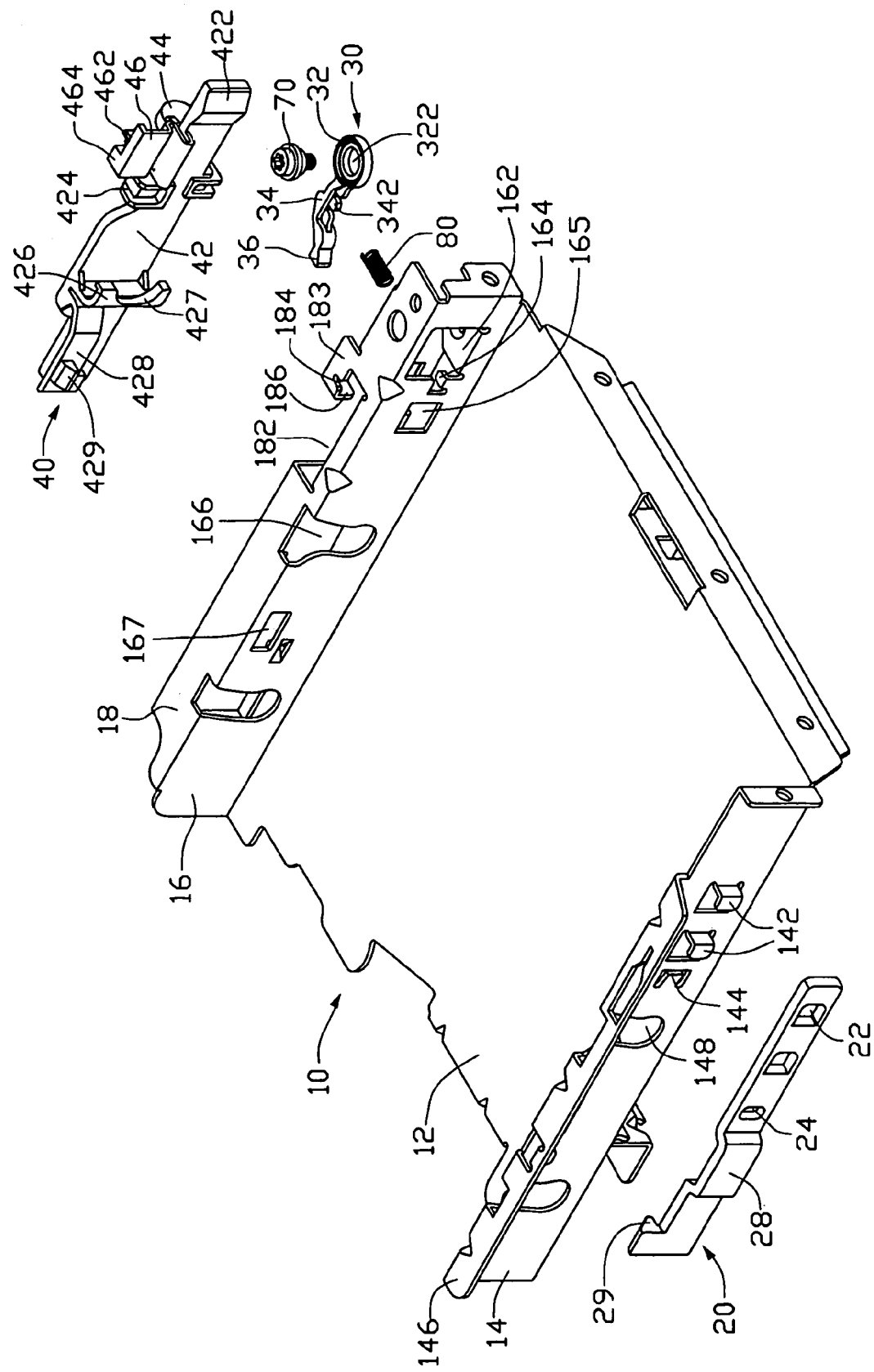
FIG. 1 is an exploded, isometric view of a mounting apparatus of a preferred embodiment of the present invention, the mounting apparatus including a bracket, a retaining member, a locking member and an operating member.
Figure 2:
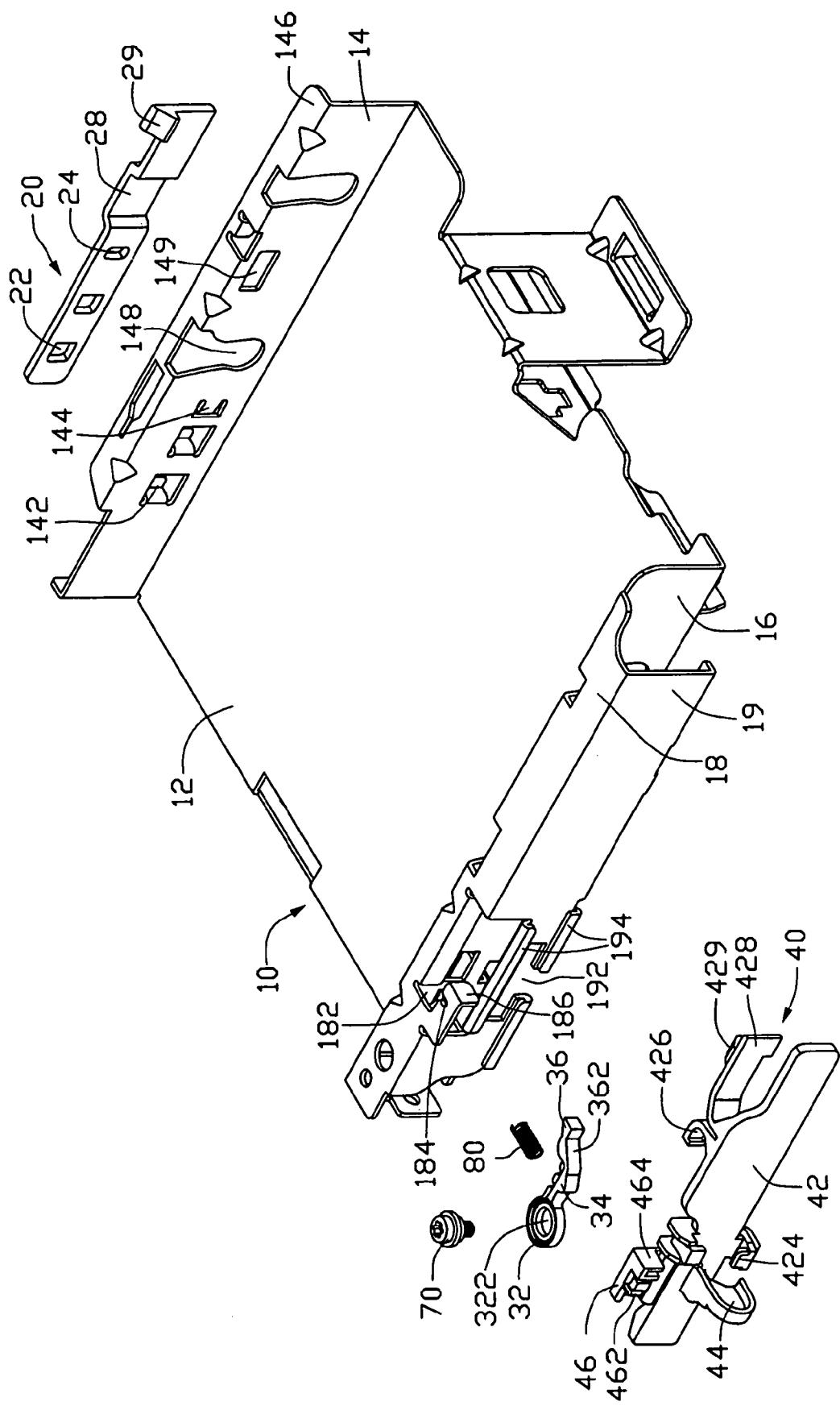
FIG. 2 is similar to FIG. 1, but showing in another aspect.
Figure 3:
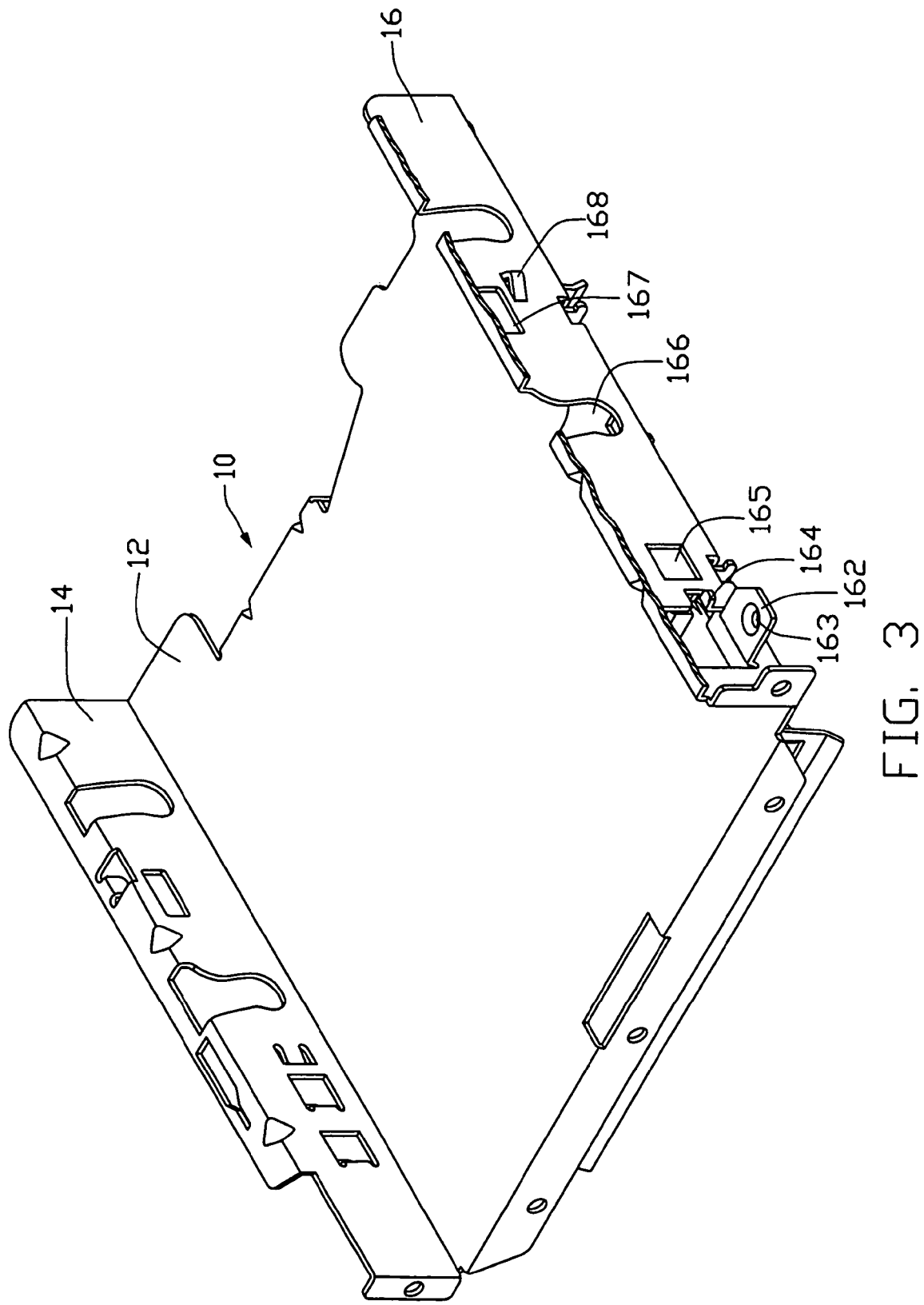
FIG. 3 is a cutaway view of the bracket.

Referring to FIGS. 1 to 3, a mounting apparatus includes a bracket 10 mounted to a chassis (unshown), a retaining member 20, a locking member 30 and an operating member 40, all of which are attachable to the bracket 10 and comprise bracket-engagement means thereon for fixing any storage device in the bracket 10.

The bracket 10 includes a bottom plate 12, a pair of side plates 14, 16 extending vertically upward from opposite edges of the bottom plate 12 and a pair of top flanges 146, 18 extending horizontally outward from top edges of the side plates 14, 16 respectively. A pair of L-shaped positioning tabs 142 protrudes outward from a front portion of the side plate 14. A resilient stopping clip 144 is formed on the side plate 14 adjacent to the positioning tab 142. Two guiding holes 148 extending to the top flange 146 are defined in the side plate 14. A rectangular opening 149 is defined between the two guiding holes 148 of the side plate 14 thereof (as shown in FIG. 2).

A projecting clip 162 with a screw hole 163 extends outward from a front portion of the side plate 16. A mounting tab 164 protrudes from the side plate 16 adjacent to the projecting clip 162. A through opening 165 is defined in the side plate 16. Two guiding holes 166 extending to the top flange 18 are defined in the side plate 16, corresponding to the guiding holes 148 of the side plate 14. An outer plate 19 extends downwardly from an edge of the top flange 18. A rectangular opening 167 is defined between the two guiding holes 166 therein. A protrusion 168 is outward formed under the rectangular opening 167. A cutout 182 is defined in the top flange 18 extending to the outer plate 19. A mounting clip 183 extends outward from the top flange 18. A stopping clip 186 bends downwardly from the mounting clip 183. A notch 184 is defined in an edge of the mounting clip 183. An entrance 192 is defined in the outer plate 19 corresponding to the cutout 182. A pair of rails 194 is formed on both sides of the entrance 192.

The retaining member 20 has an elongated body. Two positioning holes 22 and a securing hole 24 are defined in the retaining member 20, respectively corresponding to the positioning tabs 142 and the stopping clip 144 of the side plate 14. A flat portion 28 protrudes outward from the retaining member 20 corresponding to one guiding hole 148 of the side plate 14. A hook 29 extends upwardly from an end of the retaining member 20. The hook 29 may retractably insert through the rectangular opening 149 of the side plate 14 of the bracket 10.

The locking member 30 is rotatably mounted to the projecting tab 162 of the side plate 16 with a screw 70. The locking member 30 includes a pivot portion 32 with a pivot hole 322 defined, a locking portion 36 used as one of the bracket-engagement means having an aslant surface 362, and a connecting portion 34 between the locking portion 36 and the pivot portion 32. A mounting tab 342 protrudes inward from the connecting portion 34 corresponding to the mounting tab 164 of side plate 16 of the bracket 10.

The operating member 40 includes a main body 42, an operating portion 44 perpendicular to the main body 42, and a mounting portion 46 formed on a top edge of the main body 42. A pressing portion 422 is formed at a front end of the main body 42 for engaging with the locking portion 36 of the locking member 30. A latching portion 426 used as another of the bracket-engagement means extends from a rear end of the main body 42. An arc cutout 427 is defined in the latching portion 426. A resilient arm 428 extends from the rear end of the main body 42. A hook 429 used as another of the bracket-engagement means protrudes from the resilient arm 428 corresponding to the rectangular opening 167 of the side plate 16 of the bracket 10. A pair of L-shaped sliding portions 424 is formed from opposite edges of the main body 42 adjacent to the mounting portion 46, corresponding to the rails 194 of the outer plate 19. A positioning tab 462 protrudes from the mounting portion 46 corresponding to the notch 184 of the mounting clip 183 of the top flange 18. A stopping tab 464 is formed on the mounting portion 46 for abutting against the stopping clip 186 of the top flange 18.

Figure 4:
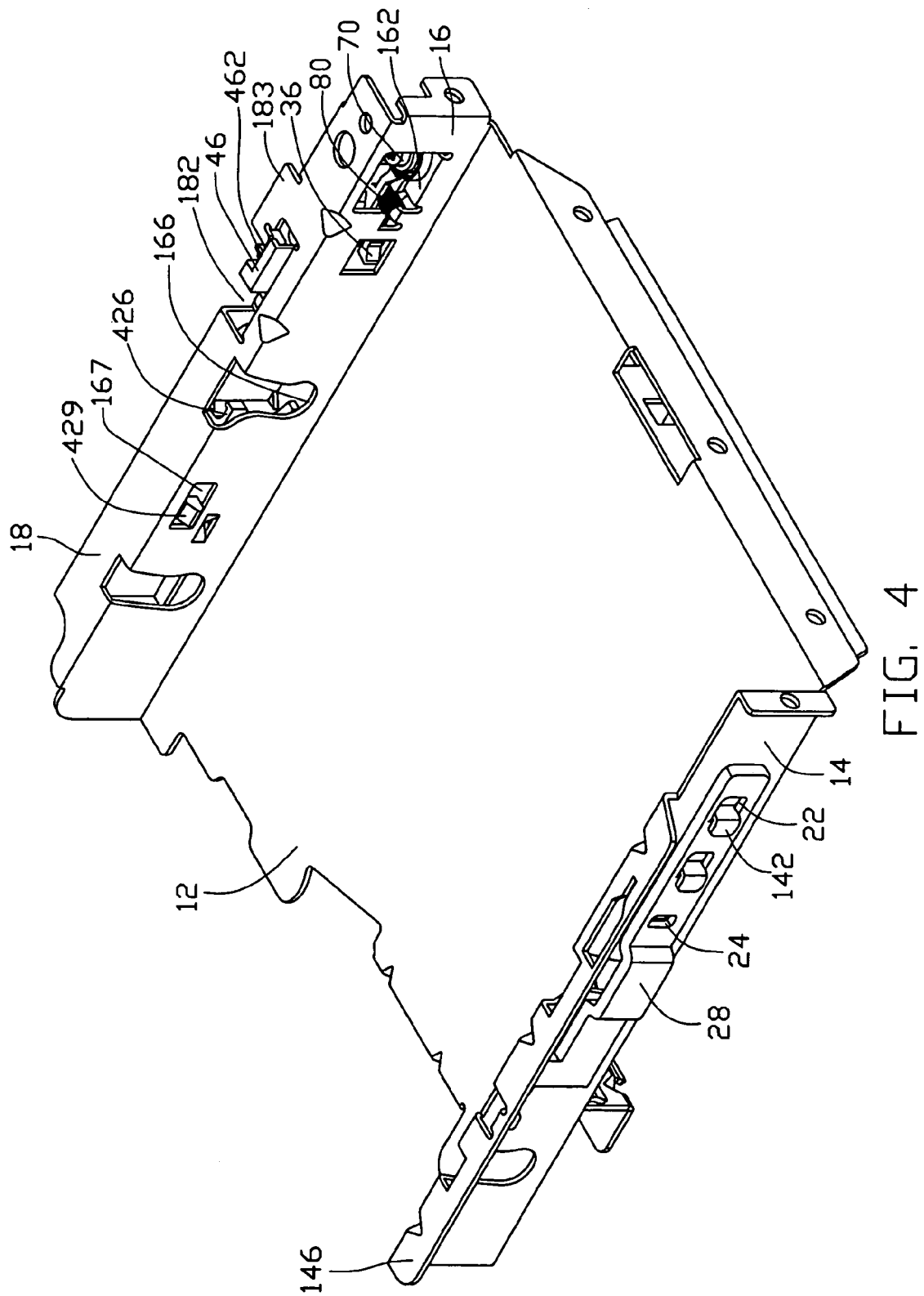
FIG. 4 is an assembly view of FIG. 1.

Referring also to FIG. 4, in assembly, the positioning tabs 142 of the side plate 14 engages in the positioning holes 22 of the retaining member 20. The stopping clip 144 inserts into the securing hole 24 to prevent the positioning tabs 142 being detached from the positioning holes 22. The hook 29 inserts through the rectangular opening 149 of the side plate 14. The flat portion 28 aligns with one of the guiding holes 148 of the side plate 14. The retaining member 20 is thus mounted to the side plate 14 of the bracket 10.

The locking member 30 is rotatablely secured to the projecting tab 162 with the screw 70. A spring 80 is connected between the mounting tabs 164, 242 of the side plate 16 and the locking member 30.

The locking member 30 is pivoted to the side plate 16. The spring 80 is resiliently deformed. The operating member 40 is then inserted into a space between the outer plate 19 and the side plate 16. The pressing portion 422 of the operating member 40 presses the locking portion 36 of the locking member 30. The mounting portion 46 extends through the cutout 182 of the top flange 18. The operating portion 44 slides in the entrance 192 of the outer plate 19. The sliding portions 424 slidably engage with the rails 194 of the outer plate 19. The protrusion 168 is sandwiched between the side plate 16 and the resilient arm 428 of the operating member 40. The hook 429 is out of the rectangular opening 167 of the side plate 16 for the resilience of the resilient arm 428 of the operating member 40. The spring 80 has minimal deformation. The operating member 40 is thus slidably attached to the bracket 10 and in a unlocked position.

Figure 5:
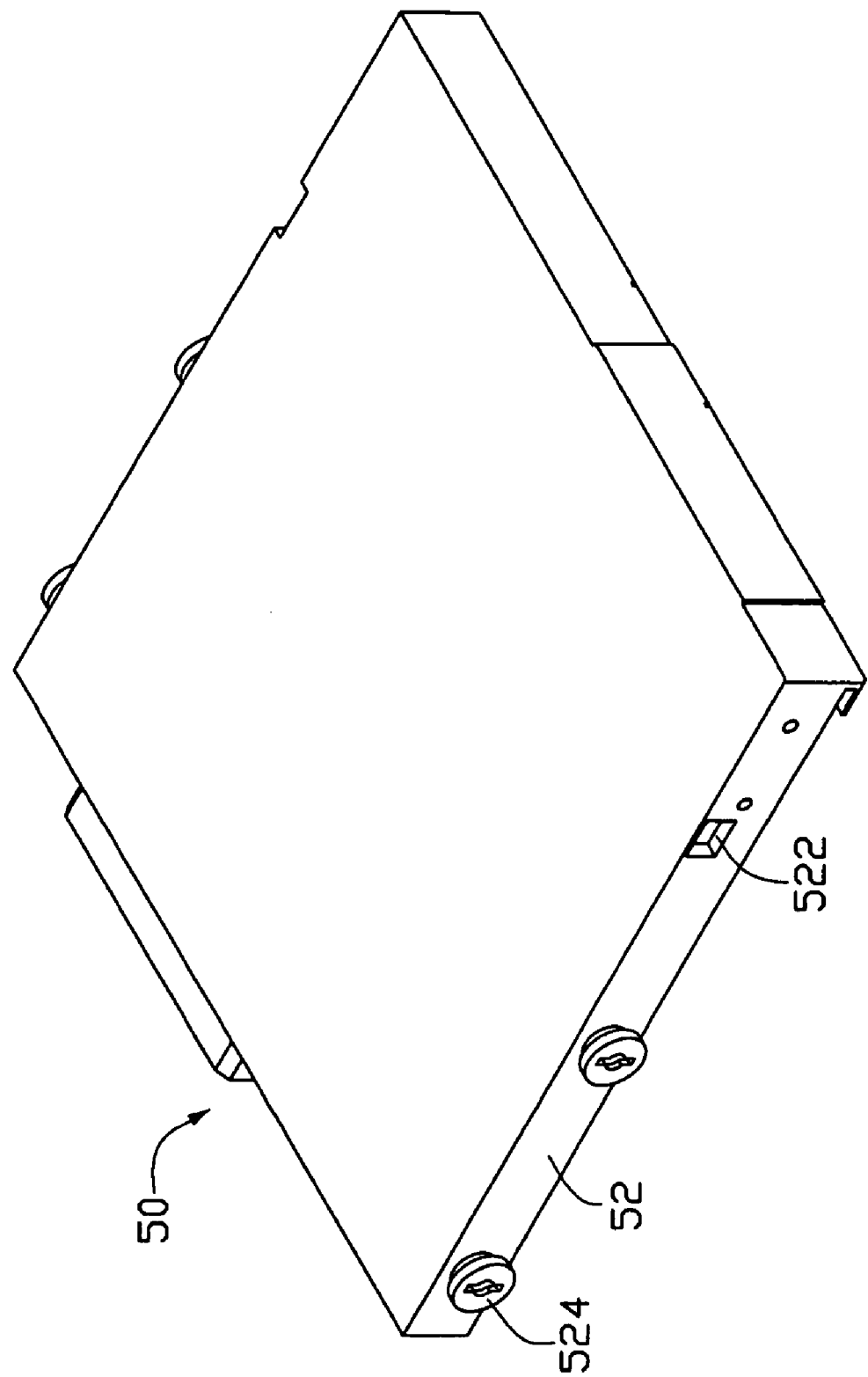
FIG. 5 is an isometric view of a storage device.
Figure 6:
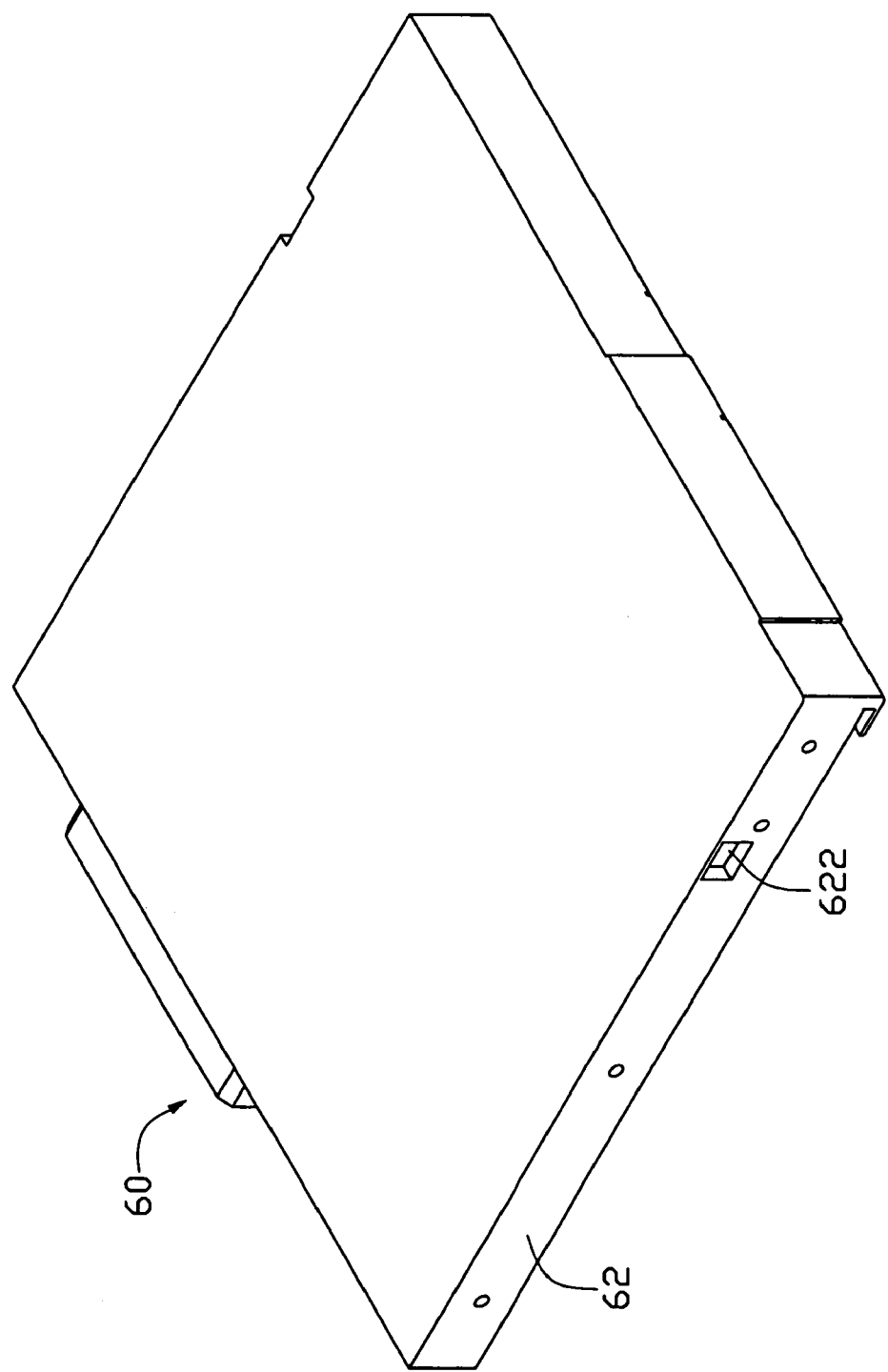
FIG. 6 is an isometric view of another storage device.

Referring to FIGS. 5 and 6, both storage devices 50, 60 have side walls 52, 62 with mounting slots 522, 622. The storage device 50 further has a plurality of fasteners, such as screws 524, on the side walls 52. Both of the mounting slots 522, 622 and fasteners 524 are used as device-engagement means for fixing the storage devices 50, 60.

Figure 7:
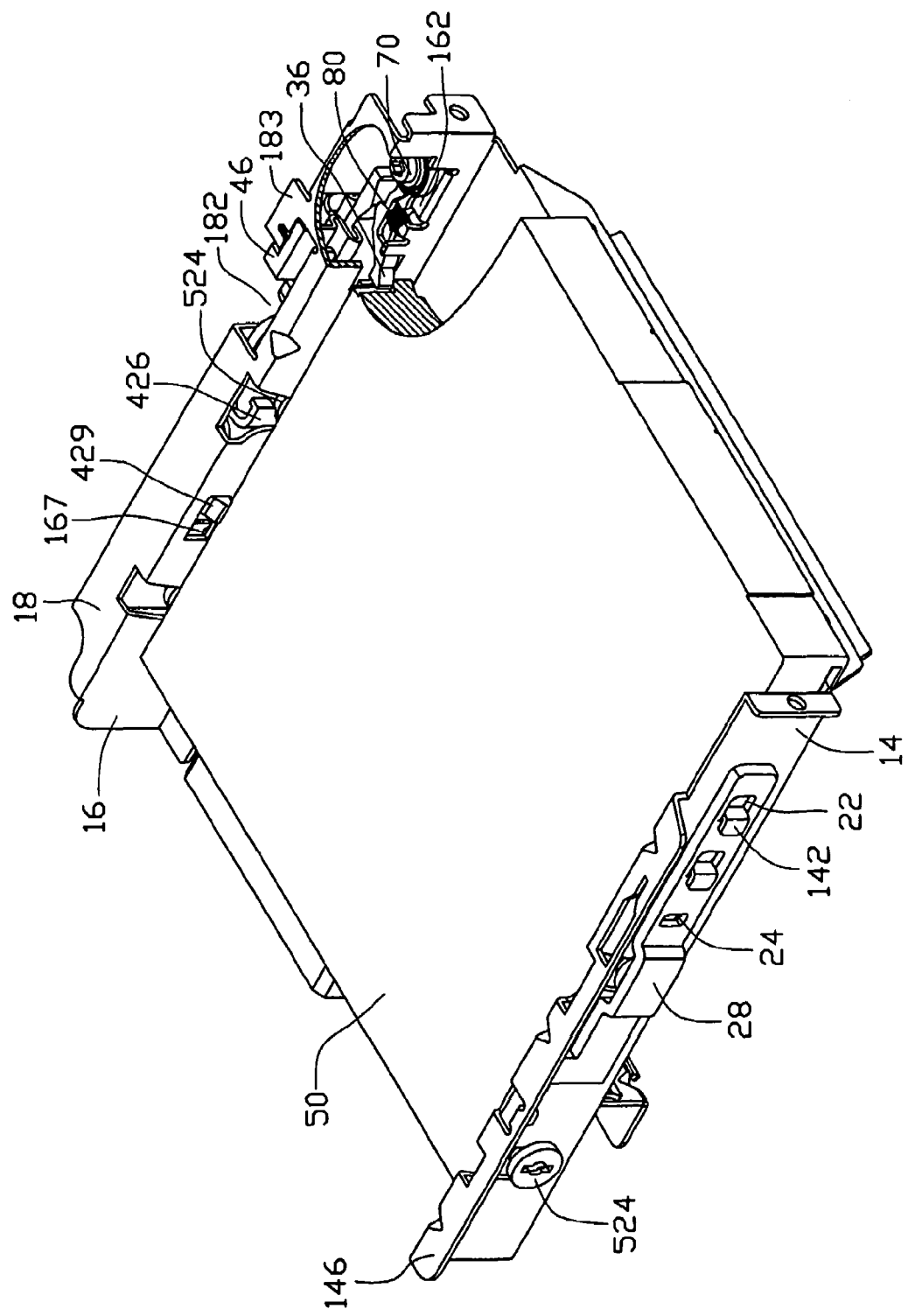
FIG. 7 is similar to FIG. 4, but showing the storage device of FIG. 5 installed into the bracket with a part-cutaway and the operating member in a locked position.
Figure 8:
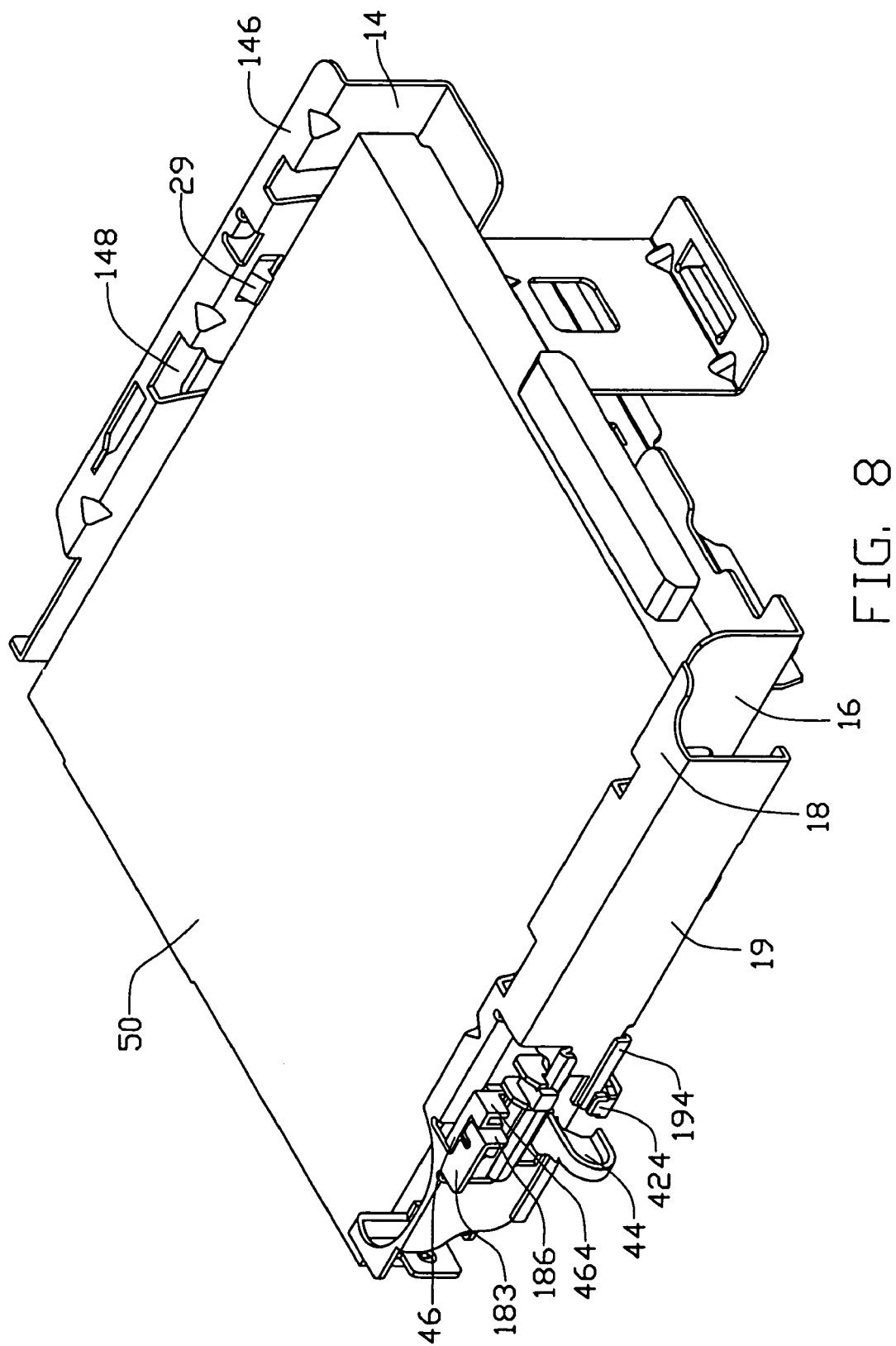
FIG. 8 is similar to FIG. 7, but showing in another aspect.

Referring also to FIGS. 7 and 8, in assembly, the storage device 50 is lowered from a top to insert into the bracket 10 in a vertical direction. The screws 524 of the storage device 50 insert into the guiding holes 148 of the bracket 10. The mounting slot 522 of the storage device 50 is aligned to the through opening 165 of the side plate 16. The hook 29 protrudes retractably from the rectangular opening 149 of the side plate 14 and abuts against the top of the storage device 50.

The mounting portion 46 of the operating member 40 is then biased inward to have the positioning tab 462 to avoid the mounting clip 183 of the bracket 10. Simultaneously, the operating portion 44 is pushed to slide the operating member 40, with the sliding portions 424 sliding along the rails 194 of the outer plate 19. The pressing portion 422 of the operating member 40 pushes the aslant surface 362 of the locking portion 36 of the locking member 30. The locking portion 36 is rotated to insert into the mounting slot 522 of the storage device 50 via the through opening 165 of the side plate 16. The spring 80 resiliently deforms. The resilient arm 428 disengages from the protrusion 168. The hook 429 of the operating member 40 inserts through the rectangular opening 167 of the side plate 16 to depend against the top of the storage device 50. The cutout 427 of the latching portion 426 engages with the screw 524 of the storage device 50. The mounting portion 46 of the operating member 40 is then released. The positioning tab 462 of the mounting portion 46 engages in the notch 184 of the mounting clip 183 for preventing the operating member 40 moving reversely. The spring 80 has a maximal resilient deformation. The operating member 40 is in a locked position. The storage device 50 is thus mounted in the bracket 10.

Figure 9:
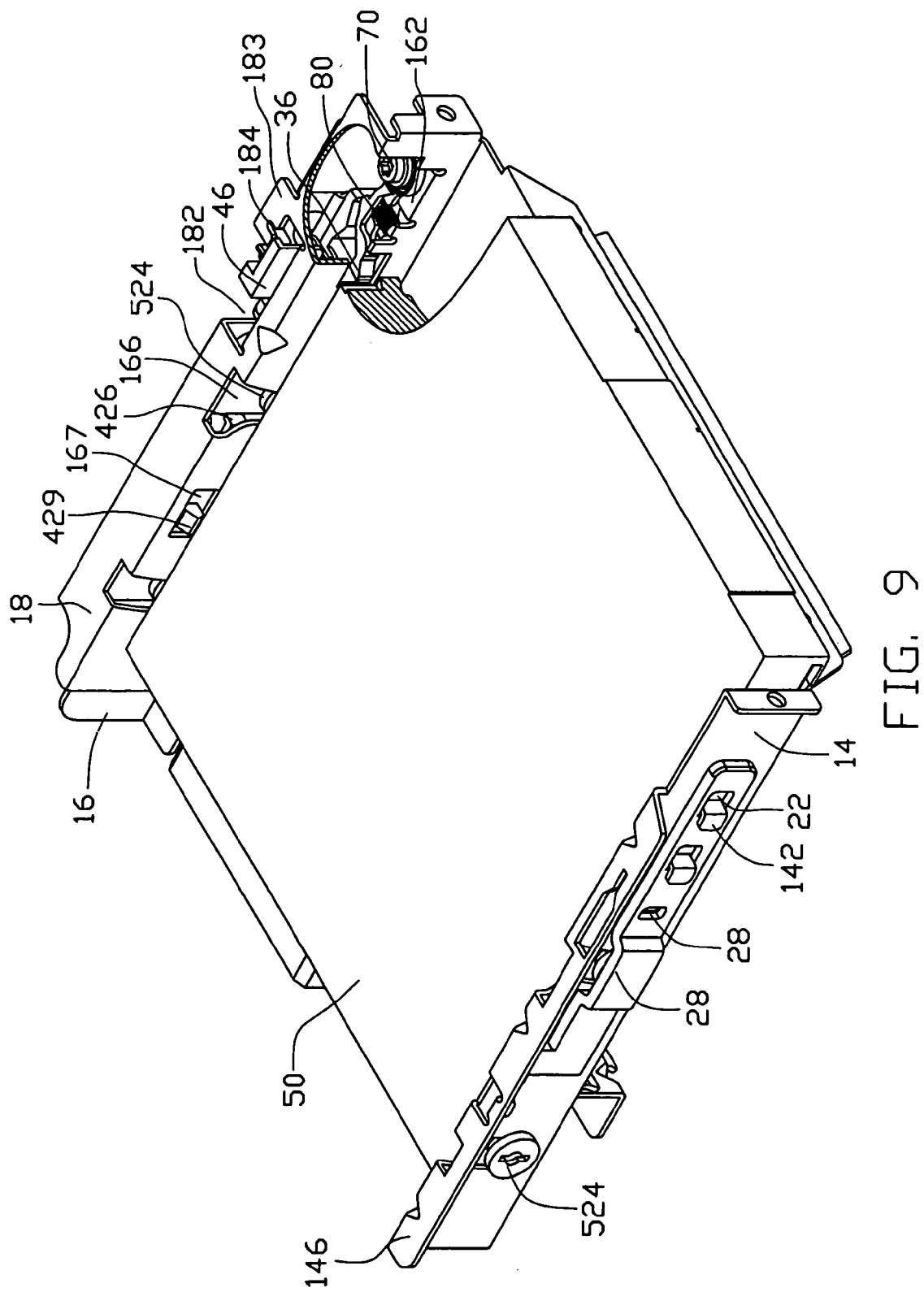
FIG. 9 is similar to FIG. 7, but showing the operating member in a unlocked position.

Referring also to FIG. 9, in disassembly of the storage device 50, the mounting portion 46 is deflected to disengage from the mounting clip 183. The operating portion 44 is pushed to slide the operating member 40 reversely. The pressing portion 422 of the operating member 40 gradually releases the locking portion 36 of the locking member 30. The locking member 30 is thus rotated to draw the locking portion 36 out from the mounting slot 522 of the storage device 50 via the through opening 165 of the side plate 16. The cutout 427 of the latching portion 426 disengages from the screw 522 of the storage device 50. The protrusion 168 deforms the resilient arm 428 of the operating member 40 outwardly, so that the hook 429 of the resilient arm 428 is drawn out from the rectangular opening 167 of the side plate 16. The rear end of the retaining member 20 is pulled to disengage the hook 29 from the rectangular opening 149 of the side plate 14. The storage device 50 is thus removed from the bracket 10.

Figure 10:
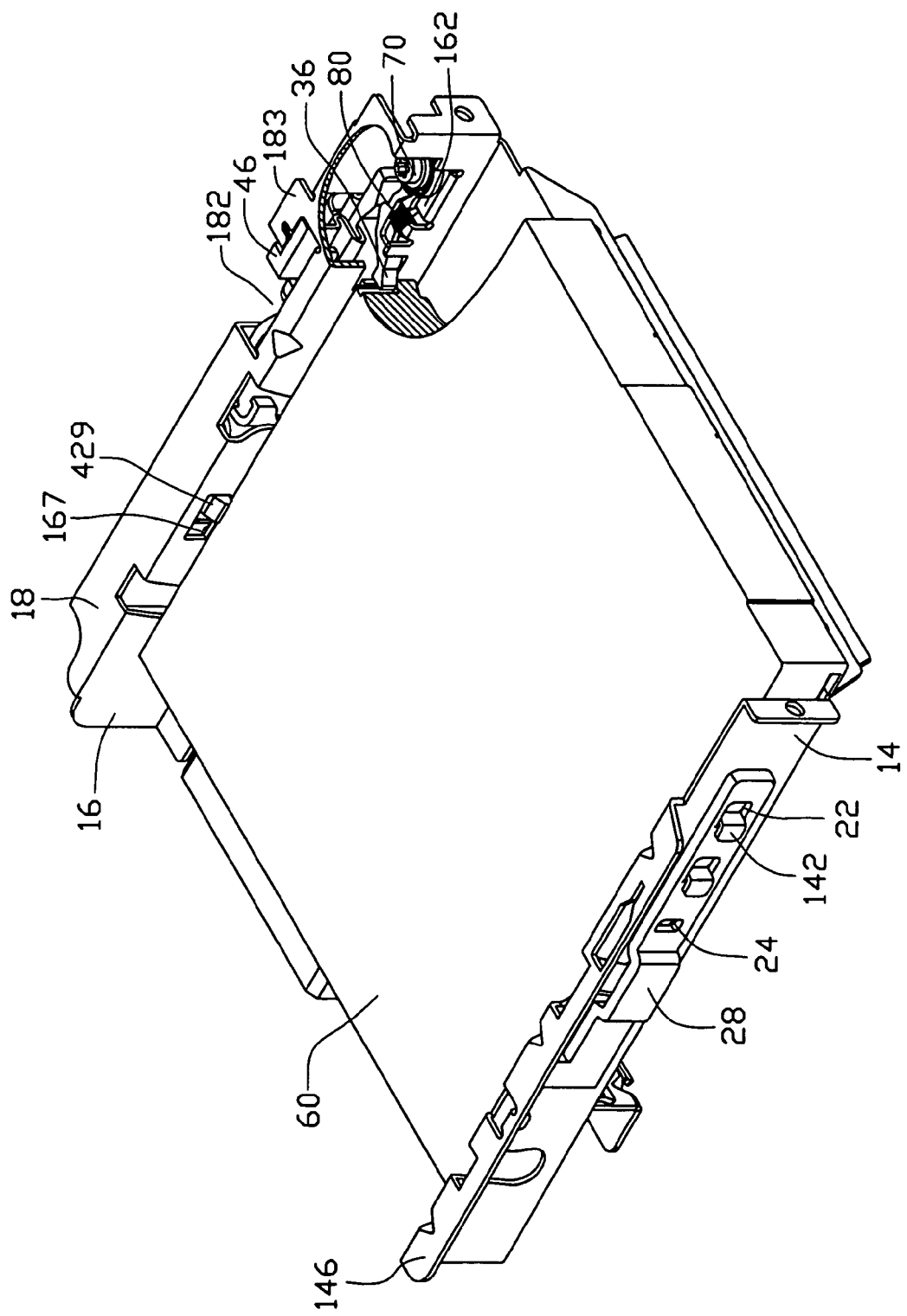
FIG. 10 is similar to FIG. 7, but showing the storage device of FIG. 6 replacing the storage device of FIG. 5.
Figure 11:
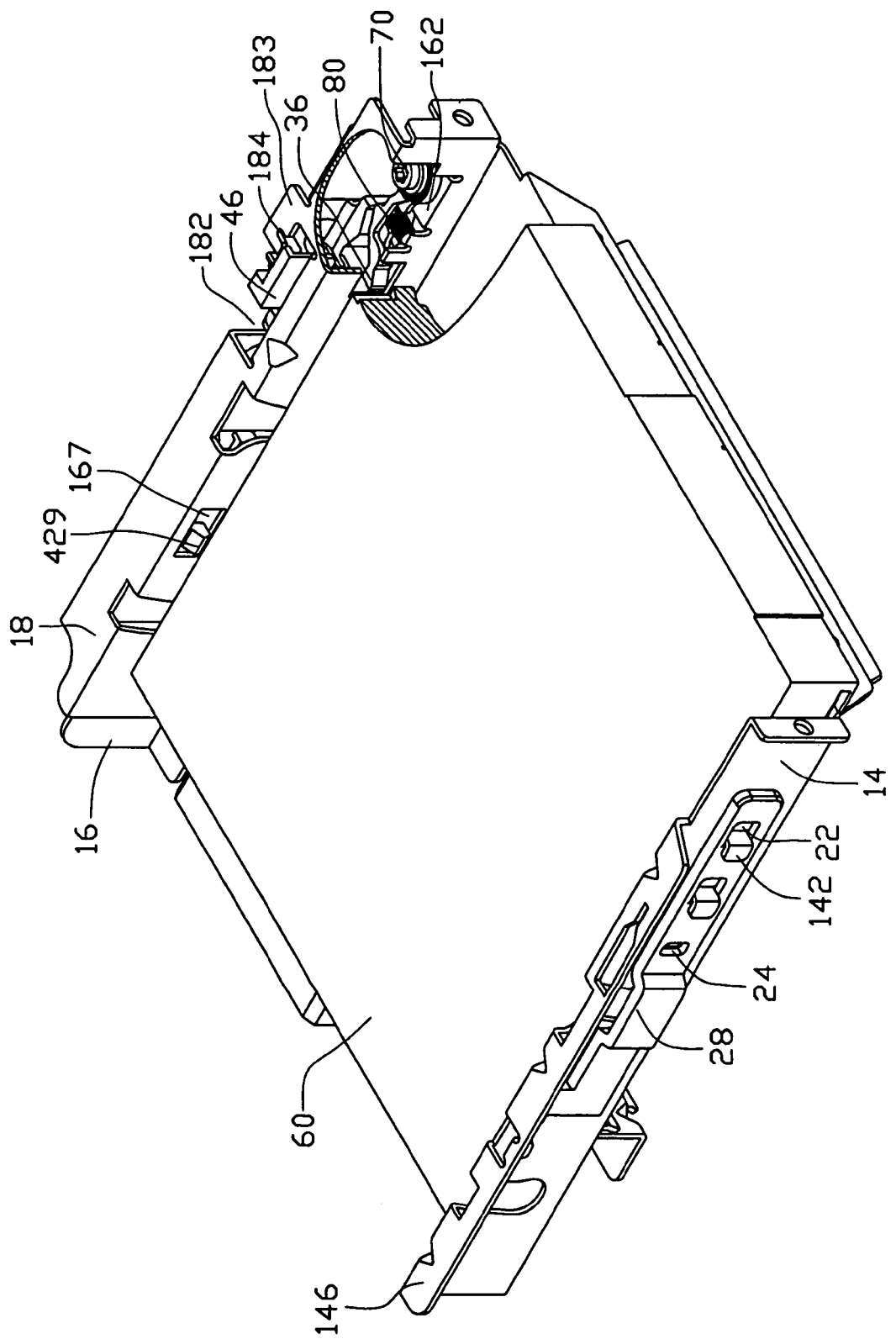
FIG. 11 is similar to FIG. 7, but showing the storage device of FIG. 6 replacing the storage device of FIG. 5.

Referring also to FIGS. 10 and 11, in assembly of the storage device 60 without fasteners such as screws, the storage device 60 can be thus installed into the bracket 10 in a horizontal direction and a vertical direction. The process of the assembly and disassembly of the storage device 60 is similar to that of the storage device 50.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A storage device assembly comprising:
    a storage device with a fastener thereon;
    a bracket for accommodating the storage device, the bracket defining a guiding hole for receiving the fastener of the storage device therein; and
    an operating member slidably attached to the bracket, comprising a latching portion and a deflectable mounting portion, the latching portion being engagable with the fastener and the mounting portion being engagable with the bracket when the operating member is located in a locked position, the mounting portion being deflectable to disengage from the bracket so that the operating member is slidable from the locked position to an unlocked position, in which the latching portion disengages from the fastener of the storage device.

2. The assembly as described in claim 1, wherein a cutout is defined in the latching portion of the operating member for receiving the fastener of the storage device.

3. The assembly as described in claim 1, further comprising a locking member pivotably attached to the bracket, wherein the locking member is rotatable toward the bracket to engage with the storage device when the operating member is slid from the locked position to the unlocked position.

4. The assembly as described in claim 3, wherein a spring connects between the locking member and the bracket for rotating the locking member to disengage from the storage device.

5. The assembly as described in claim 1, wherein a pair of rails is formed on the bracket, and a pair of sliding portion protrudes from the operating member for slidably engaging with the rails.

6. The assembly as described in claim 1, further comprising a retaining member mounting on the bracket for restricting the storage device.

7. The assembly as described in claim 1, wherein an opening is defined the bracket, and a hook protrudes from the operating member and is engagable with the opening of the bracket.

8. The assembly as described in claim 7, wherein a protrusion projects from the bracket, and is capable of deforming the operating member to draw the hook out of the opening of the bracket when the operating member is slid from the locked position to the unlocked position.

9. The assembly as described in claim 1, wherein a cutout is defined in the bracket for the mounting portion inserting therethrough.

10. The assembly as described in claim 9, wherein a notch is defined in the bracket, and a positioning tab projects from the mounting portion for receiving in the notch.

11. A storage device assembly comprising:
a storage device with a mounting slot defined therein;
a bracket for accommodating the storage device, a through opening being defined in the bracket;
a locking member pivotably attached to the bracket for engaging in the mounting slot of the storage device; and
an operating member slidably attached to the bracket, comprising a deflectable mounting portion for engaging with the bracket and preventing the operating member moving, and a pressing portion for driving the locking member to insert through the through opening of the bracket.

12. The assembly as described in claim 11, wherein the operating member further comprising a latching portion for engaging with the storage device.

13. The assembly as described in claim 11, wherein a notch is defined in the bracket, and a position tab protrudes from mounting portion of the operating member for engaging in the notch.

14. The assembly as described in claim 11, wherein a spring connects between the locking member and the bracket for driving the locking member outward from the bracket.

15. The assembly as described in claim 11, wherein the operating member further comprises a hook protruding therefrom to insert through an opening defined in the bracket.

16. The assembly as described in claim 15, wherein a protrusion projects from the bracket for deforming the operating member, thereby drawing the hook out of the opening of the bracket.

17. A storage device assembly comprising:
a storage device defining at least two device-engagement means along a side thereof and each of said at least two device-engagement means spaced from each other; and
a bracket for accommodating said storage device therein comprising at least two bracket-engagement means corresponding to said at least two device-engagement means respectively and capable of facing said side of said storage device when said storage device moves to be accommodated within said bracket, each of said at least two bracket-engagement means operable to move relative to said side of said storage device in said bracket between a first position thereof where said each of said at least two bracket-engagement means engages with a corresponding one of said at least two device-engagement means to fix said storage device within said bracket, and a second position thereof where said each of said at least two bracket-engagement means disengages from said corresponding one of said at least two device-engagement means to release said storage device for moving away out of said bracket, an operably urging direction of said each of said at least two bracket-engagement means for engagement being different from urging directions of others of said at least two bracket-engagement means.

18. The assembly as described in claim 17, wherein said device-engagement means selectively comprises mounting slots and a plurality of fasteners.

19. The assembly as described in claim 18, wherein said bracket-engagement means selectively comprises a resilient arm corresponding to one of said mounting slots and a latching portion corresponding to one of said fasteners formed on an operating member attachable to said bracket, and a locking portion corresponding to another of said mounting slots formed on a locking member attachable to said bracket.

20. The assembly as described in claim 19, wherein said operably urging direction of said resilient arm for engagement is opposite to said urging direction of said locking portion of said locking member, and perpendicular to said urging direction of said latching portion.

* * * * *